Sept. 9, 1969　　　　　G. A. B. BYRT　　　　　3,465,981
DISC BRAKES AND TORQUE VARYING MEANS THEREFOR
Filed July 20, 1967
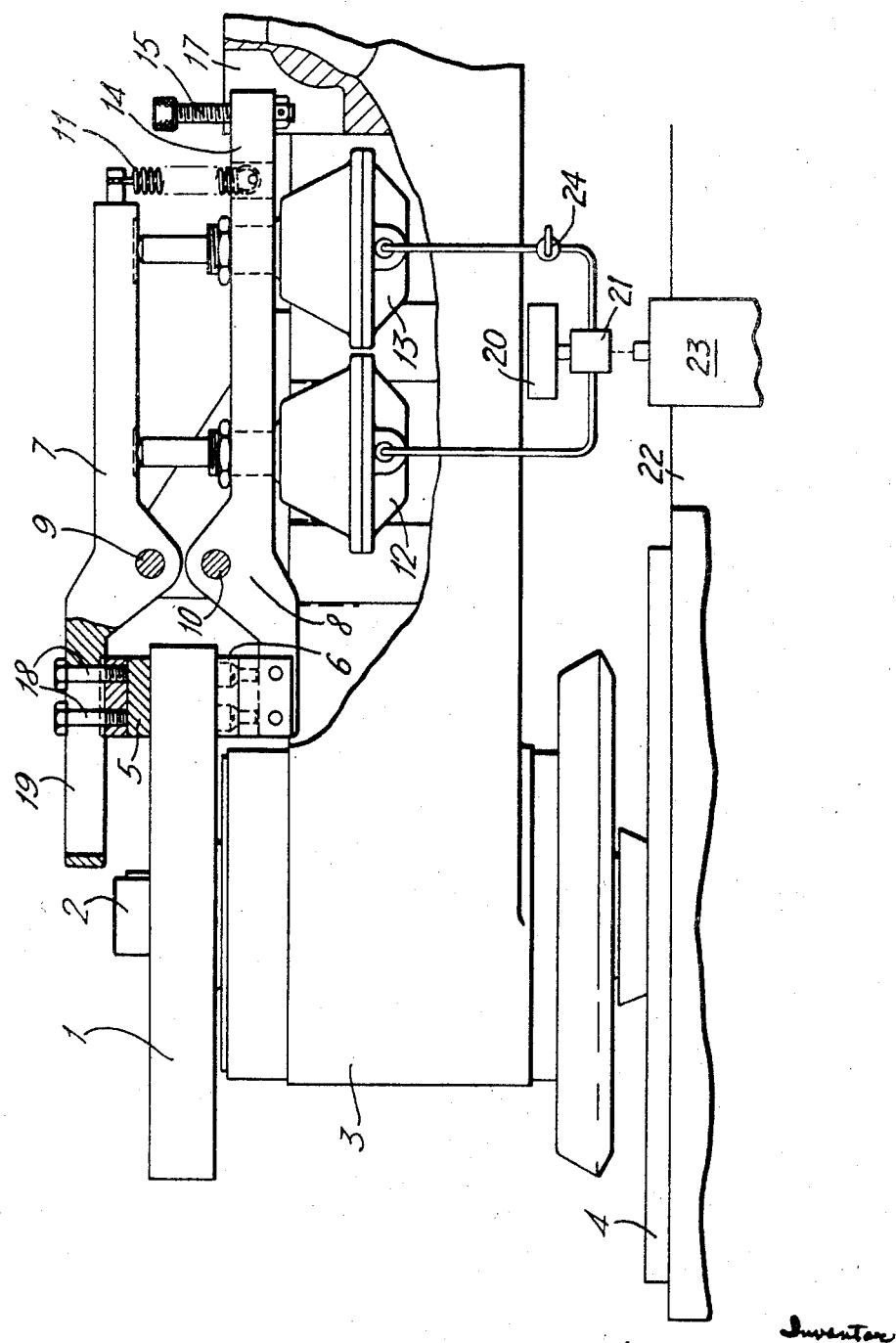

United States Patent Office 3,465,981
Patented Sept. 9, 1969

3,465,981
DISC BRAKES AND TORQUE VARYING MEANS THEREFOR
Graham Archie Bruce Byrt, Bristol, England, assignor to Masson Scott Thrissell Engineering Limited, Summerstown, London, England, a corporation of Great Britain
Filed July 20, 1967, Ser. No. 654,755
Claims priority, application Great Britain, Aug. 1, 1966, 34,499/66
Int. Cl. B65h 25/22; B60t 11/10
U.S. Cl. 242—75.43    7 Claims

ABSTRACT OF THE DISCLOSURE

A disc brake for a printing paper reel having a pair of brake pads mounted on arms to embrace the disc, one pad being movable along its arms to vary the resultant braking torque. The brake is actuated by a pneumatic motor the pressure of which is varied as required and a second pneumatic motor is connected in the same air line as the first to provide reserve braking power the strength of which is thereby automatically varied.

BACKGROUND OF THE INVENTION

Field of the invention.—This invention is concerned with improvements in disc brakes for use in braking a shaft rotating about an axis, of the type comprising a pair of pads (hereinafter referred to as the "type described") mounted one on each of a pair of pivoted brake arms which are actuated upon operation of the brake to urge the pads to bear against either side of a disc mounted upon the shaft to rotate therewith.

Description of the prior art.—Such brakes have many applications and in some of these, such as for instance, the braking of a running reel supplying sheet or thread material, it is necessary to vary the braking torque produced in the shaft according to the moment of inertia of the rotating reel, which is of course dependent upon the dimensions and weight of the particular reel used as well as the amount of material left on the reel, so as to avoid imposing an excessive strain on the running web or thread. With fluid-actuated brakes this can be achieved by varying the pressure of the fluid supplied to the brake, but in the case of air-actuated brakes the range of variation of braking torque which can be obtained in this way is limited and is sometimes not wide enough to meet the requirements of operation.

SUMMARY OF THE INVENTION

It is an object of this invention to provide an improved disc brake having a wide range of variation in the braking torque which it can apply. According to the present invention there is provide a disc brake of the type described provided with a brake pad which is adjustable in position along its brake arm to be engageable with the disc at different positions to vary the ratio of the displacement of the pad from the axis of pivoting of its brake arm to that from the axis of rotation of the shaft thereby to vary the braking torque applied to the shaft. The invention also provides a disc brake of the type described in which provision is made to lock one of the brake arms in position so that it cannot engage the disc so that the braking pressure applied to the disc is thereby halved. This effectively doubles the range of braking torques which can be produced in the shaft by the brake.

It is often desirable to provide a disc brake with additional power means for applying an increase braking effort to the disc for use in circumstances of emergency. However, if the brake is used for braking running reels supplying web or thread material it is nevertheless important that the tension produced in the web or thread by the braking action should not go so high as to break the web or thread. It is thus necessary to ensure that the emergency braking pressure does not exceed certain limits and these limits will vary according to the weight of material on the reel.

It is another object of this invention to provide a disc brake having a variable emergency braking means. To achieve this a disc brake of the type described is actuated by a fluid power motor and a reserve fluid power motor is provided for emergency use and in addition means are provided to control and vary the pressure supplied to the normal braking motor according to the braking torque required and the emergency braking motor is connected through these means so that the pressure it applies to the brake pad varies in accordance with the effort of the normal brake.

BRIEF DESCRIPTION OF THE DRAWING

The above and other aspects of the invention will now be described by way of example with reference to the single figure of the accompanying drawing which is a plan view of a disc brake mounted on the shaft of a reel supplying paper to a printing machine.

DESCRIPTION OF THE PREFERRED EMBODIMENT

Referring to the drawing a disc brake comprises a disc 1 mounted on a shaft 2 carried in a bearing 3 which supports the reel 4 of a paper supply roller for a printing machine. Braking torque is applied to the disc 1 by means of braking pads 5 and 6 mounted on the ends of radially extending caliper arms 7 and 8 respectively and urged out of engagement with the disc 1 by means of a tension spring 11. The brake is actuated by means of a normal air-actuated brake diaphragm cylinder 12 and a reserve air actuated brake diaphragm cylinder 13 each acting to urge the caliper arms apart. Caliper arm 8 has its ends remote from the brake pad an extension 14 which is apertured to receive a stop bolt 15 which can be screwed in position to abut a rigid stop 17, and prevent arm 8 moving away from arm 7 so that brake pad 6 is not brought into braking engagement with the disc 1 by operation of the air cylinders 12 and 13.

Brake pad 5 is provided with a pair of locking screws 18 which engage for sliding movement within a slot 19 formed in a caliper arm 7 so that its radial position in engagement with the disc 1 can be varied. The resultant braking torque produced in the shaft 2 by the engagement of pad 5 with the disc 1 is proportional to the moment of the force applied by the pad 5 about the shaft 2 and inversely proportional to the moment of said force about the pivot 9. Thus as any increase of the distance from the pad 5 to shaft 2 is necessarily accompanied by a decrease in the distance from the pad 5 to pivot 9, the braking torque in the shaft 2 varies substantially with any change of position of the pad 5, being proportional to the ratio of the distances of pad 5 from the pivot 9 and from the shaft 2 (said distances being, of course, measured normal to the line of action of the force applied by pad 5 to the disc).

Air is supplied to the cylinders 12 and 13 from a common source 20 and the supply is controlled by valve means 21. The pressure of the air supplied is varied in proportion to the tension in the web 22 by means of a dance roll 23 around which the web running off the reel 4 passes. This dance roll connected to the valve means 21 acts to vary the air pressure supply according to the speed of travel of the web and diameter of the material on the reel which each affect the tension in the web.

Thus the braking torque exerted on the shaft 2 by the disc brake may be varied in three ways; firstly by varying the air pressure supplied to the cylinders 12 and 13; secondly, by a factor of two, by locking the arm 8; and thirdly by adjusting the position of the pad 5 along the length of the arm 7.

In the particular embodiment described, the position of the two pads 5 and 6 is determined according to the nature of the material carried on the reel. The controls are operated so that whilst the reel 4 is running and the web or thread of material is being unwound, cylinder 12 applies a small predetermined braking torque to the shaft 2 which is adjusted to produce a constant tension in the web by the controlling action of the dance roll on the air pressure supply. When the reel is to be stopped the air supply to cylinder 12 is also switched by switch means 24 to the reserve braking cylinder 13 which, as a result of the action of the dance reel, automatically exerts on the brake pad or pads a pressure which is adjusted to take account of the running speed and the weight of material left on the reel.

What I claim as my invention and desire to secure by Letters Patent is:

1. A disc brake for use in braking a shaft rotating about an axis comprising a disc mounted on the shaft to rotate therewith, a pair of brake pads arranged to embrace the disc, a pair of pivotably mounted brake arms each carrying one of the brake pads and means to pivot the brake arms to urge the pads against the disc upon operation of the brake, said means to pivot the brake arms comprising a normal fluid-powered motor to actuate the brake, a reserve fluid-powered motor to provide increased braking effort in emergency, said reserve motor being arranged to apply pressure to said brake arms a greater distance from the pivot points of said arms than said normal motor, means to control and vary the fluid pressure supplied to the normal braking motor according to the braking torque required, and switch means to connect the reserve motor to said fluid pressure control means so that the emergency braking effort varies according to the normal braking power.

2. Apparatus for supplying sheet or thread material from a reel and including a brake having means for varying the braking torque according to the moment of inertia of the rotating reel to avoid excessive strain on the running web or thread, said apparatus comprising a rotatably mounted supply reel, a disc mounted to rotate therewith, a pair of brake pads arranged to embrace the disc, a pair of pivotably mounted brake arms each carrying one of the brake pads, means to pivot the brake arms to urge the pads against the disc upon operation of the brake, sensing means responsive to the tension in the web or thread fed from the reel for controlling said means to pivot the brake arms whereby said tension is maintained constant, and means for adjustably securing at least one of said brake pads at a plurality of positions along its brake arm whereby said brake pad is engageable with the disc at different positions to vary the ratio of the displacement of the pad from the axis of pivoting of its brake arm to that from the axis of rotation of the shaft to vary the braking torque applied to the shaft.

3. Apparatus as claimed in claim 2 wherein said sensing means comprises a dance roll.

4. A disc brake for use in braking a shaft rotating about an axis comprising a disc mounted on the shaft to rotate therewith, a pair of brake pads arranged to embrace the disc, a pair of pivotably mounted brake arms each carrying one of the brake pads, means to pivot the brake arms to urge the pads against the disc upon operation of the brake, and means for adjustably securing at least one of said brake pads at a plurality of positions along its brake arm, whereby said brake pad is engageable with the disc at different positions to vary the ratio of the displacement of the pad from the axis of pivoting of its brake arm to that from the axis of rotation of the shaft to vary the braking torque applied to the shaft, said means to pivot the brake arms comprising a normal fluid-powered motor, a reserve fluid-powered motor to provide increased braking effort in emergency, said reserve motor being arranged to apply pressure to said brake arms a greater distance from the pivot points of said arms than said normal motor, means to control and vary the fluid pressure supplied to the normal braking motor according to the braking torque required, and switch means to connect the reserve motor to said fluid pressure control means so that the emergency braking effort varies according to the normal braking power.

5. A disc brake according to claim 4 wherein said means to pivot the brake arms comprises actuating means for operating said pair of brake arms simultaneously, said brake further comprising means operable to lock one of the brake arms to prevent the pad mounted thereon engaging the disc upon operation of the brake.

6. A disc brake according to claim 4 wherein the adjustable brake pad is movable along a line between the two axes.

7. A disc brake according to claim 6 wherein said brake arms extend radially of the disc, said means for adjustably securing said brake pad comprising a slot in said arm for receiving a part of said brake pad for movement along a radius of the disc and releasable means to lock the pad against such movement.

References Cited

UNITED STATES PATENTS

| | | | |
|---|---|---|---|
| 1,940,845 | 12/1933 | Conner et al. | 188—73 |
| 2,169,629 | 8/1939 | Browall | 188—195 |
| 2,472,548 | 6/1949 | Schnell | 242—75.43 |
| 2,557,185 | 6/1951 | Gibbs | 188—83 X |
| 2,911,070 | 11/1959 | Seelig | 188—59 |
| 2,964,440 | 12/1960 | Stevens | 242—75.53 X |
| 3,048,240 | 8/1962 | Helsten | 188—59 |

FOREIGN PATENTS 1,096,182  12/1954  France.

GEORGE E. A. HALVOSA, Primary Examiner

U.S. Cl. X.R.

188—73, 106, 152; 242—156.2